United States Patent [19]

Solley et al.

[11] Patent Number: 5,170,030
[45] Date of Patent: Dec. 8, 1992

[54] PLASMA TORCH ELECTRONIC PULSING CIRCUIT

[75] Inventors: Dennis J. Solley, Merrimack County; David A. Tatham, Grafton County, both of N.H.

[73] Assignee: Thermal Dynamics Corporation, West Lebanon, N.H.

[21] Appl. No.: 762,852

[22] Filed: Sep. 18, 1991

Related U.S. Application Data

[63] Continuation-in-part of Ser. No. 682,727, Apr. 8, 1991.

[51] Int. Cl.[5] .............................................. B23K 9/10
[52] U.S. Cl. .......................... 219/121.54; 219/121.48; 219/121.57
[58] Field of Search ..................... 219/124.02, 121.57, 219/121.54, 121.55, 121.48, 121.52, 75

[56] References Cited

U.S. PATENT DOCUMENTS

| | | | |
|---|---|---|---|
| 4,280,042 | 7/1981 | Berger et al. | 219/121.54 |
| 4,324,971 | 4/1982 | Frappier | 219/121.57 |
| 4,598,191 | 7/1986 | Marhic et al. | 219/121.57 |
| 4,839,499 | 6/1989 | Kotecki et al. | 219/121.54 |
| 4,943,699 | 7/1990 | Thommes | 219/121.57 |
| 5,036,176 | 7/1991 | Yamaguchi et al. | 219/121.54 |

*Primary Examiner*—Mark H. Paschall
*Attorney, Agent, or Firm*—Paul M. Denk

[57] ABSTRACT

A plasma arc torch having new electronic circuit concepts wherein main current regulated power means regulates the pilot current prior to main arc transfer. Further, the circuit may contain two inductors to which DC current initially flows but is interrupted upon main arc transfer such that one inductor maintains the pilot arc while the current in the second inductor forces the establishment of the transferred arc. Also, advantages are presented in pulsing the cutting arc as well as pulsing the pilot arc.

8 Claims, 4 Drawing Sheets

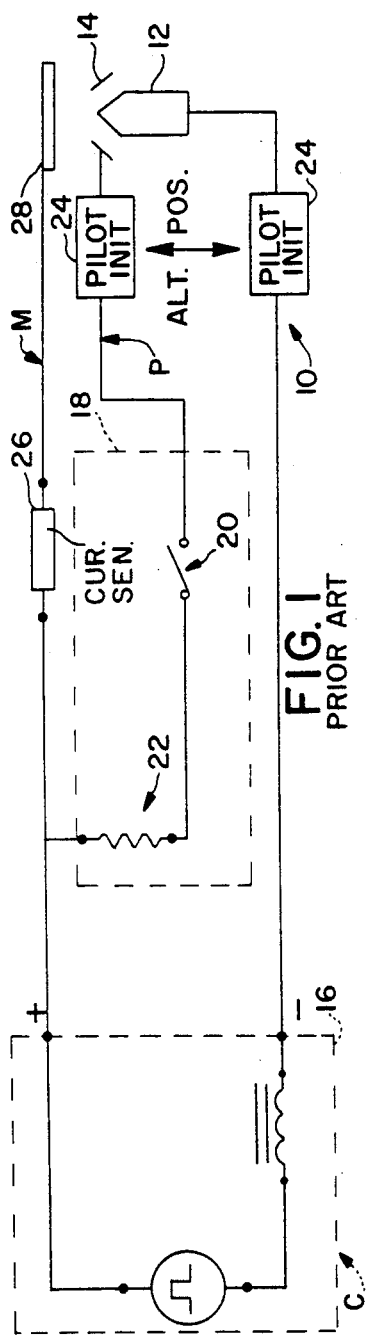
FIG. 1 PRIOR ART
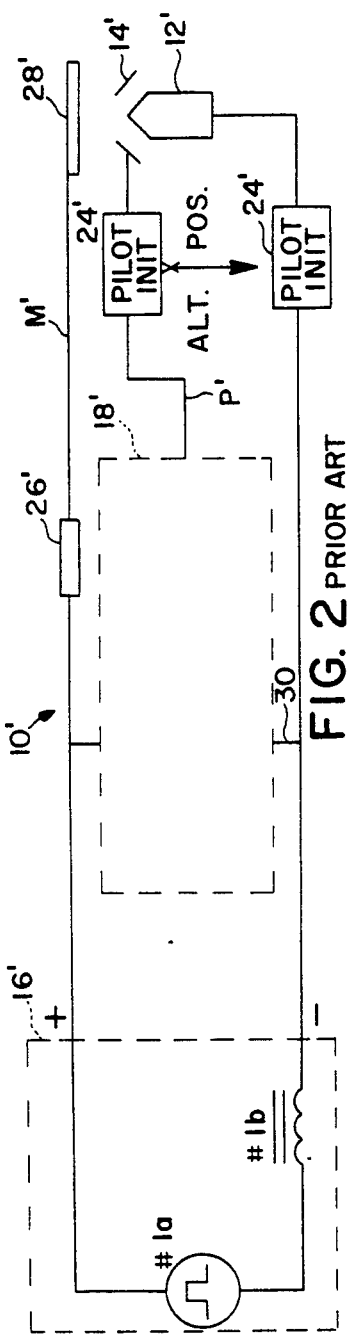
FIG. 2 PRIOR ART
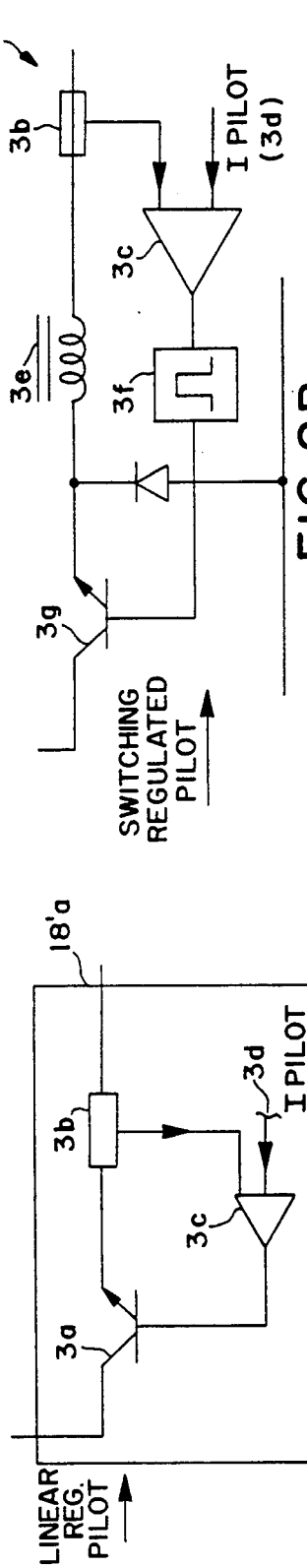
FIG. 2A PRIOR ART
FIG. 2B PRIOR ART

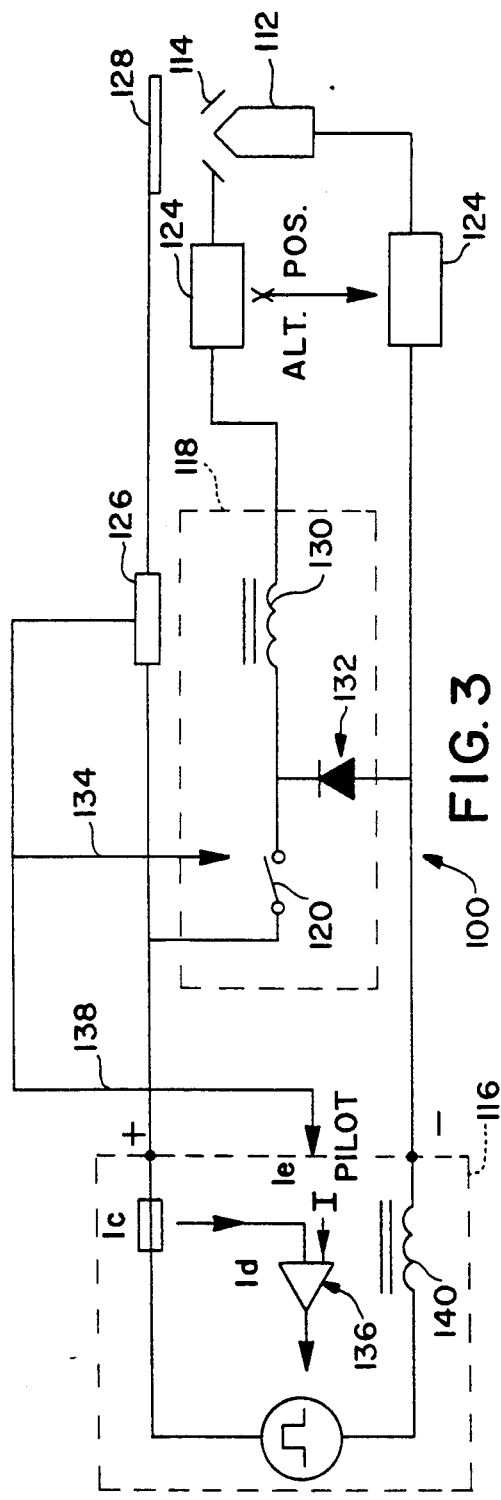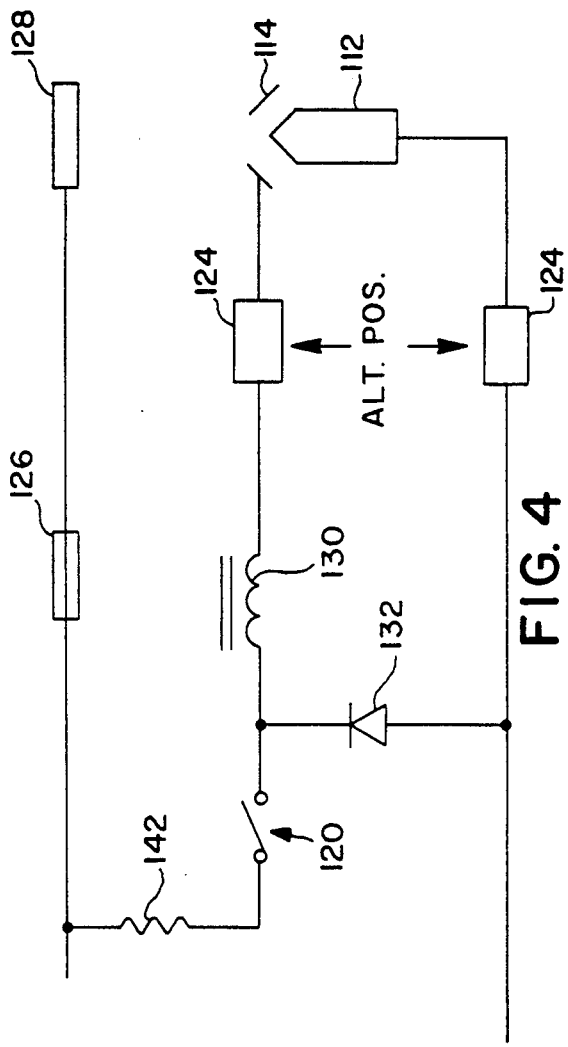

PLASMA TORCH ELECTRONIC PULSING CIRCUIT

CROSS-REFERENCE TO RELATED APPLICATION

The subject matter of this application is related to and comprises a continuation-in-part of the patent application having Ser. No. 07/682,727, filed on Apr. 8, 1991 pending, which application is owned by a common assignee.

BACKGROUND OF THE INVENTION

The present invention is in the field of plasma torches and in particular is directed to a plasma torch having an improved pilot and main arc generating circuit.

Plasma torches, otherwise known as electric arc torches, are known in the art for performing operations, such as cutting, welding, etc , on workpieces, and operate by directing a plasma consisting of ionized gas particles towards a workpiece. An example of the conventional single gas plasma torch is illustrated in Hatch, U.S. Pat. No. 3,813,510, assigned to the assignee herein Other patents disclosing such torches are U.S. Pat. Nos. 4,225,769; 4,663,512; and 4,663,515. The disclosures of all of the above-mentioned patents are incorporated herein by reference thereto. As these patents illustrate, a gas to be ionized, such as nitrogen, is fed through channels in the torch mechanism in such a manner as to swirl in front of the end of a negatively charged electrode. The welding tip which is adjacent the end of the electrode has a sufficiently high voltage applied thereto to cause a spark gap to jump between the electrode and the welding tip, thereby heating the gas and causing it to ionize. A pilot DC voltage between the electrode and the welding tip maintains the pilot arc. The iononized gas in the gap appears as a flame and extends externally of the tip where it can be seen by the operator. The extension of the pilot arc and the flame, which for practical purposes, may be considered as being co-extensive depends upon the power in the gap—i.e., the arc current—as well as the pressure of the gas forced into the gap and out of the torch. The pilot arc provides a source of light which enables the operator to see the proper position for the torch before starting the welding or cutting operation. In actual practice, when the pilot arc is on, a loop-shaped arc extending out of the torch can be seen. As the torch head is brought down towards the workpiece, the pilot arc jumps from the electrode to the workpiece due to the fact that the impedance of the workpiece current path is lower than the impedance of the welding tip current path.

Conventional single gas plasma torches include pilot arc circuits which provide a 20-40 amp. pilot arc current at 100-200 volts across the electrode-tip gap, resulting in an extension of the arc about ¼-½ inch past the welding tip. As a consequence, the torch must be brought to within about ¼-½ inch of the workpiece before the transfer arc jumps to the workpiece. This creates difficulties in the starting of cutting or welding operations.

SUMMARY OF THE INVENTION

It is an object of the invention to provide a plasma arc torch circuit which is more efficient than prior art circuits and which regulate the power source in response to sensing of the torch arch transferring between the pilot electrode and the work member It is another object of the invention to optimize the power regulator design with respect to semiconductor switch and diode stresses, transformer and inductor design and overall component count.

It is still a further object to provide a plasma arc torch with smoother on-plate transfer dynamics Briefly stated, the present invention comprises new electronic circuit concepts for a plasma arc torch wherein main current regulated power means regulates the pilot current prior to main arch transfer Further, the circuit may contain two inductors to which DC current initially flows but is interrupted upon main arc transfer such that one inductor maintains the pilot arc while the current in the second inductor forces the establishment of the transferred arc. Also, advantages are presented in pulsing the cutting arc as well as pulsing the pilot arc.

These, as well as other objects and advantages will become more apparent upon a reading of a detailed description of the preferred embodiment in conjunction with the drawings, wherein:

BRIEF DESCRIPTION OF THE DRAWINGS

FIG. 1 is a schematic wiring diagram of one prior art plasma arc torch operating circuit;

FIG. 2 is schematic wiring diagram of another prior art plasma arc torch operating circuit;

FIG. 2A is a schematic wiring diagram of a prior art pilot arc regulating circuit as used within FIG. 2;

FIG. 2B is a schematic wiring diagram of another prior art pilot arc regulating circuit as used within FIG. 2;

FIG. 3 is a schematic wiring diagram depicting a plasma arc torch operating circuit according to the principles of the present invention;

FIG. 4 is a schematic wiring diagram of a modified embodiment of the present invention as it would be configured within the circuit of FIG. 3.

DETAILED DESCRIPTION OF THE PREFERRED EMBODIMENT

Figure 5A:
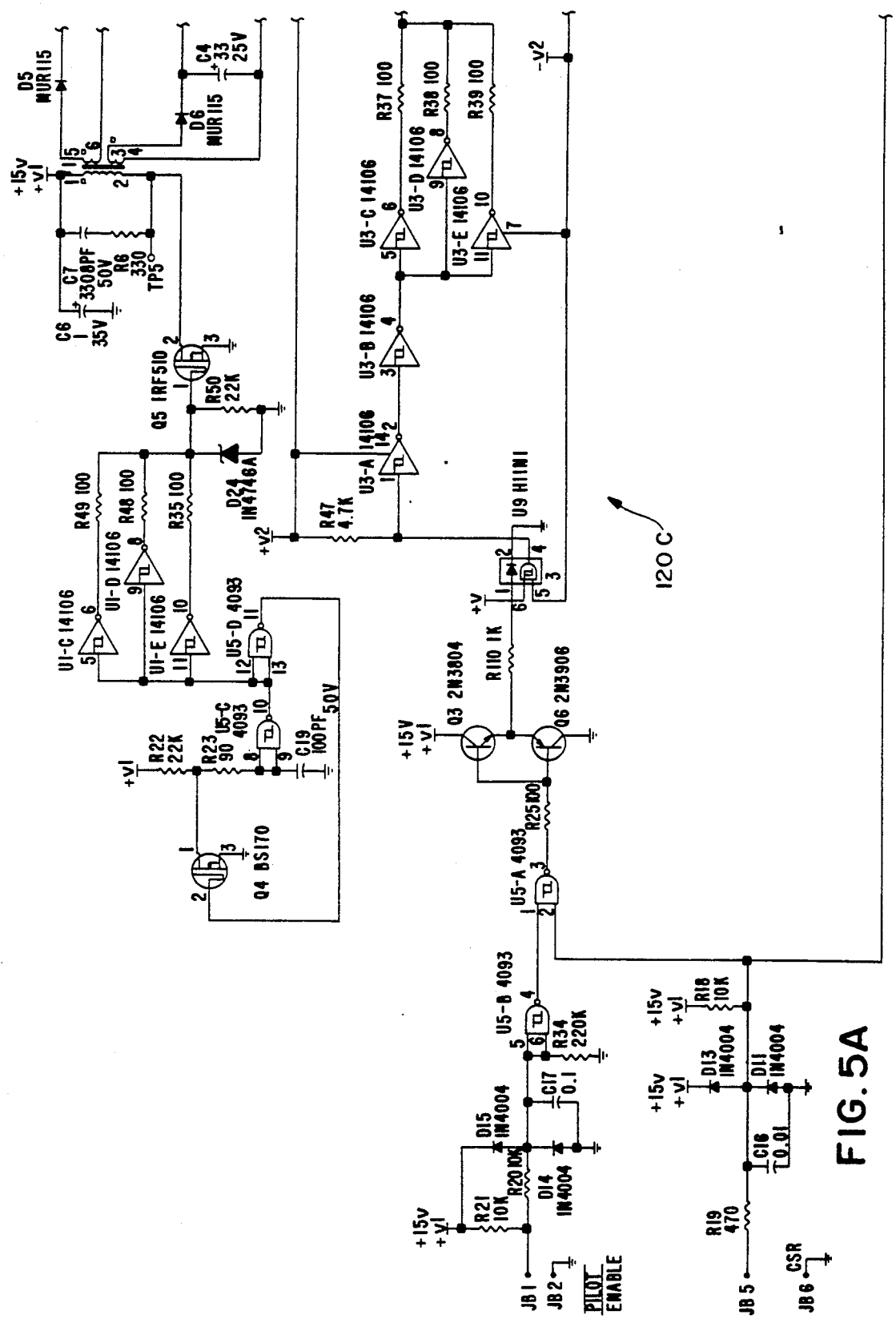
FIGS. 5A and B, in combination, are a more detailed schematic wiring diagram of the present invention

With reference to the drawings, and FIG. 1 in particular, there is shown a schematic wiring diagram for one prior art plasma arc torch, generally referred to by the reference numeral 10. Torch 10 includes torch tip electrode 12 and annular torch pilot electrode 14 spaced from tip electrode 12. An electronic pilot circuit P connected between tip electrode 12 and pilot electrode 14 provides an electric potential between electrodes 12 and 14 to create a pilot arc which heats a supplied gas such as nitrogen causing it to ionize as is well known in the art. FIG. 1 shows prior art circuit C which uses a resistively regulated pilot arc having a current regulated power means 16 and a pilot regulator means 18 including a disconnect means 20 in series with a resistor 22. A high frequency pilot initiation means 24 is positioned in series with pilot regulator means 18 and may be inserted in the circuit adjacent either electrode 12 or electrode 14 as shown in FIG. 1 to initiate investigation of plasma gas to commence pilot operations.

A current sensing means 26 is connected in parallel with pilot regulator means 18 and connects with the metal to be worked at 28 in main circuit M. When tip electrode 12 is placed sufficiently close to the metal work 28 the arc will transfer to the work 28 causing current to flow through main circuit M and current sensing means 26 will sense the current differential and act to disconnect pilot regulator means 18 by opening pilot regulator means 18 by opening its disconnect means 20.

One problem associate with the prior art circuit 10 of FIG. 1 is that the circuit voltage of current regulated power means 16 must be large compared with the torch piloting voltage between tip electrode 12 and pilot electrode 14 to allow the pilot regulator means 18 to perform the function of a current source during pilot opration. This causes circuit 10 to be inefficient, power being dissipated as heat in pilot regulator means 18.

FIG. 2 shows another prior art circuit 10' similar to that of FIG. 1 in that it also contains electronically controlled pilot regulator means 18' in pilot circuit P' and a parallel main circuit M'. The circuit 10' of FIG. 2 also includes similar current operated power means 16', tip electrode 12', pilot electrode 14', current sensing means 26', pilot initiation means 24' (alternatively positioned as shown) and work piece or member 28'. The difference between circuit 10' of FIG. 2 and circuit 10 of FIG. 1 is the provision of circuit connection on the opposite side of power means 16 from current means 26' connected to pilot regulator means 18' in order to provide a second current regulated control loop, one for pilot arc operation and one for transferred main arc cutting.

FIG. 2A shows one prior art pilot regulating circuit 18'a wherein the pilot is linearly regulated; that is, the pilot current is regulated against a set demand means 3d by varying the conductance of a linear element 3a.

FIG. 2B shows another prior art pilot regulating 18'b wherein the pilot is switch regulated. That is, the pilot is regulated against a set demand 3d' to vary the duty cycle of a switching element 3g within a feedback loop. Either scheme can tightly regulate the pilot arc against AC line variations and against plasma gas in use, however, both add parts count and cost to the torch and are relatively inefficient.

FIG. 3 shows the preferred plasma torch circuit 100 in accordance with the principles of the present invention. Circuit 100 includes torch tip electrode 112, pilot electrode 114, current regulated power means 116, pilot regulator means 118, alternatively positionable pilot initiation means 124, current sensing means 126, and metal work 128. Pilot regulator means 118 comprises an electronic disconnect 120 in series with a current smoothing and energy storage inductor 130, and a freewheeling diode 132 connected in parallel with disconnect 120 and in series with inductor 130.

According to the invention, current sensing means 126 not only controls disconnect 120 through line 134, but also sends a current signal to comparator 136 through line 138 which controls the output of power means 116.

During torch piloting, disconnect means 120 is "on" and is in its saturated state. The voltage seen between the metal work piece 128 and torch tip electrode 112 is essentially the voltage at which the torch maintains the pilot arc determined by torch geometry and the plasma gas used. This voltage is considerably lower than the open circuit voltage used in prior art torch circuits. When the torch is brought sufficiently close to metal work piece 128, ionization current is detected by current sensing means 126. In response to sensing the working current, sensing means 126 acts through line 134 to force disconnect means 120 to its "off" or high impedance state. At the moment of arc trnasfer to work piece 128, the pilot arc is maintained by current flowing through energy storage inductor means 130 and the free-wheeling diode means 132. At the same instant, the current flowing in through the smoothing inductor means 140 of power regulator 116 is forced to flow between the workpiece 128 and torch tip electrode 112, thereby maintaining the transferred plasma arc. When the energy is dissipated in the storage inductor means 130, the pilot arc between torch tip electrode 112 and pilot electrode 114 self extinguishes. When transfer is detected in current sensing means 126 the pilot demand means 1e is changed and the power means 116 changes the power to that demanded for the torch operation on work piece 128.

A further embodiment of the present invention resides in additionally pulsing the pilot current.

Instead of maintaining a constant pilot demand means (1e), the demand may be pulsed between two (or more levels) at various frequencies and duty cycles. During this pulsing the pilot arc is maintained throughout and no high frequency arc initiation means 124 is required, as would be the case for a 'blown-out' pilot.

This pulsing feature offers several advantages. First, higher standoff instances between the work metal 128 and torch tip electrode 112 at the moment of transfer. Second, a tip cleaning action is observed i.e. during plasma cutting molten metal is blown onto the tip face where it adheres in particulate form. At the same time, electrode material is removed from the torch electrode and adheres to the inside tip. Both forms of contamination can cause the tip orifice to become distorted. When the pilot arc is pulsed following each cut significantly more power is dissipated in the tip electrode 112 for the pulse duration. This thermal modulation is believed to be responsible for dislodging metal particles from the inner and outer tip surfaces.

With reference to FIG. 4, there is shown an alternative circuit wherein a small resistor 142 is added in series with the pilot means 118. This modification can further improve the obtainable standoff on some plasma torch designs. The pilot current (Ip) flows through resistor 142 to generate a voltage drop (Ip×R) which is in series with the pilot voltage measured between torch tip 112 and pilot electrode 114. Thus the open circuit voltage between the metal work piece means 128 and the pilot electrode means 114 is increased, assisting the standoff at transfer. The power dissipated in this resistor is then a function of the pilot demand and pulse duration.

A further alternative circuit provides a pulsing cutting or main arc. From the invention pulsing the pilot arc before transfer it is clear that it is possible to pulse the means 1e, after the arc has transferred and while the transferred plasma arc is cutting the work metal means 128. This provision of pulsing the main arc offers several potential advantages. First, by selecting the appropriate pulse rate and duty cycle in relation to the cutting variables, it will offer a proportionally greater arc cutting capacity/penetration for a small increase in power consumption. Second, it allows the tip orifice size to be reduced in comparison to a conventional plasma cutting system operating in response to a DC demand level. This will, allow, a smaller focussed plasma column and result in smaller kerf widths. Plasma arc stability may also improve as a result of pulsing.

FIGS. 5A and B are a more specific electronic circuit schematic diagram embodying some of the concepts of the invention as enumerated above. Like reference numerals appearing in FIG. 5 refer to like circuit components or group of components as appear in FIGS. 3 and 4. Reference numberal 120c depicts the control circuit for disconnecting means 120. The power supply means is not shown in FIG. 5.

Figure 5B:
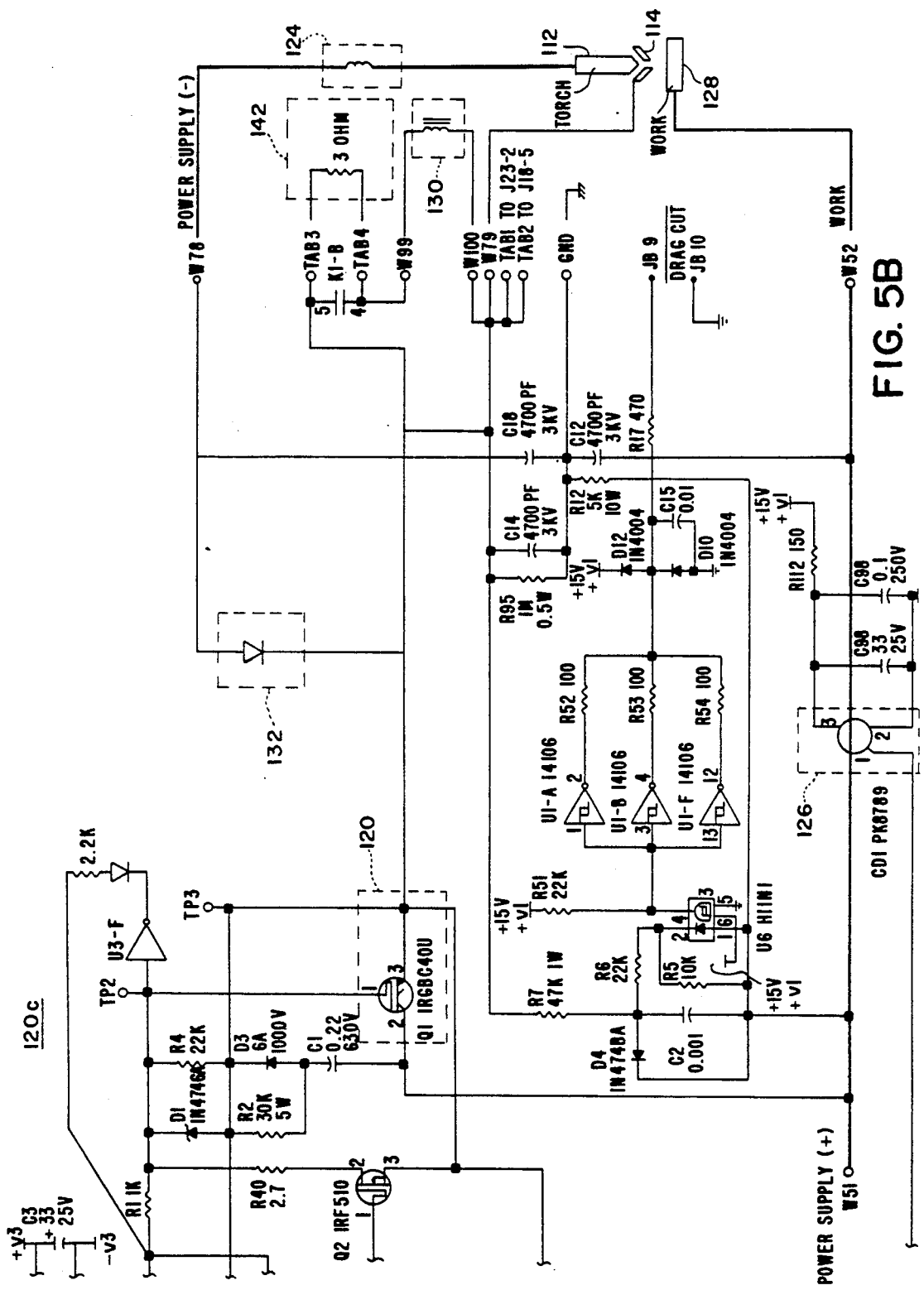

It can therefore be seen that the novel circuity shown in FIGS. 3 through 5 fulfills the objects and provides the advantages set forth above. Inasmuch as numerous changes could be made to the circitry without departying from the spirit and scope of this invention, the scope of the invention is to be determined solely by the language of the following claims as interpreted by the patent laws and in particular the doctrine of equivalents.

Having thus described the invention what is claimed and desired to be secured by Letters Patent is:

1. A plasma torch unit of the type having a torch assembly adapted to operate on a work member and having a torch electrode, a pilot electrode, and means for providing an ionized gas therebetween a current regulated power means electrically connected between said electrodes and work member to supply regulated charge to the electrode and work member during torch usage, pilot arc control means for controlling an electric arc between said electrodes and pulsing the same during torch usage, said pilot arc control means electrically connected between said current regulated power means, the electrodes, and the work member, first circuitry of the electrical connection provided between the power means and the work member, second circuitry of the electrical connection provided between the power means and the torch electrode, and third circuitry provided between the power means, pilot arc control means, and the pilot electrode, disconnect means in said second circuitry between the power means and said pilot electrode, current sensing means for sensing current in said first circuitry and generating a signal in response to torch usage, and an inductor means in series with said disconnect means and the said pilot electrode, said current sensing means operating said disconnect means with a feedback signal to pulse the generated electric arc between the electrodes, and diode means connecting between said second and third circuitry to regulate the conduct of current to the pilot electrode.

2. The torch unit of claim 1 and wherein said diode means providing for conduct of current from the current regulated power means only towards the first inductor means.

3. The torch unit of claim 2 and further including resistor means connected between said first and second circuitry and generating a voltage drop related to the pilot demand and generated pulse duration.

4. The torch unit of claim 1 and wherein a second inductor means provided within the power means and responsive to the current detected by the current sensing means to provide a pulsing of the generated main arc between the torch electrode and the metal work during torch usage.

5. The torch unit of claim 4 and wherein said current sensing means generating a signal to the second inductor to regulate the current generated by said power means and sustaining of the pulsing of the arc between the torch electrode and the work member.

6. The torch unit of claim 5 and wherein the current generated of the current regulated power means also being pulsed by the second inductor.

7. The torch unit of claim 6 and wherein said current sensing means operating to provide a pulsed pilot arc.

8. The torch unit of claim 6 and wherein said current sensing means operating to provide a pulsed main arc.

* * * * *